United States Patent
Yokozawa

(10) Patent No.: US 8,711,426 B2
(45) Date of Patent: Apr. 29, 2014

(54) METHODS AND SYSTEMS FOR IDENTIFYING AND CHANGING RESOLUTIONS TO CAUSE AN ASPECT RATIO OF A PRINTED IMAGE TO MATCH AN ASPECT RATIO OF IMAGE DATA

(75) Inventor: Yuki Yokozawa, Osaka (JP)

(73) Assignee: KYOCERA Document Solutions Inc. (JP)

( * ) Notice: Subject to any disclaimer, the term of this patent is extended or adjusted under 35 U.S.C. 154(b) by 281 days.

(21) Appl. No.: 13/280,273

(22) Filed: Oct. 24, 2011

(65) Prior Publication Data
US 2012/0099124 A1 Apr. 26, 2012

(30) Foreign Application Priority Data
Oct. 25, 2010 (JP) .................................. 2010-238995

(51) Int. Cl.
G06K 15/02 (2006.01)
H04N 1/60 (2006.01)
G06K 15/00 (2006.01)

(52) U.S. Cl.
USPC .............. 358/1.2; 358/1.9; 358/3.2; 358/1.16

(58) Field of Classification Search
None
See application file for complete search history.

(56) References Cited

U.S. PATENT DOCUMENTS

| 2001/0040684 A1 | 11/2001 | Takahashi |
| 2003/0174346 A1* | 9/2003 | Nagatani ........................ 358/1.2 |
| 2004/0091172 A1 | 5/2004 | Aihara |
| 2004/0207875 A1 | 10/2004 | Endo |
| 2005/0012941 A1 | 1/2005 | Takahashi |
| 2005/0105109 A1* | 5/2005 | Kikuchi ........................ 358/1.9 |
| 2008/0062438 A1* | 3/2008 | Lin et al. ........................ 358/1.2 |

FOREIGN PATENT DOCUMENTS

| JP | 10-304187 | 11/1998 |
| JP | 2004-082528 | 3/2004 |
| JP | 2004-165969 | 6/2004 |
| JP | 2004-186948 | 7/2004 |

* cited by examiner

*Primary Examiner* — Thomas Lett
(74) *Attorney, Agent, or Firm* — McDonnell Boehnen Hulbert & Berghoff LLP

(57) ABSTRACT

An image forming apparatus according to the present disclosure includes an image data analysis unit and an image conversion unit. The image data analysis unit is configured to identify a width-directional resolution and a height-directional resolution of image data. If the width-directional resolution and the height-directional resolution are not the same, the image conversion unit is configured to change at least one of pixel counts in a width direction and a height direction to cause a first aspect ratio for printing to match a second aspect ratio of the image data.

14 Claims, 5 Drawing Sheets

METHODS AND SYSTEMS FOR IDENTIFYING AND CHANGING RESOLUTIONS TO CAUSE AN ASPECT RATIO OF A PRINTED IMAGE TO MATCH AN ASPECT RATIO OF IMAGE DATA

REFERENCE TO RELATED APPLICATIONS

This application is based upon and claims the benefit of priority from corresponding Japanese Patent Application No. 2010-238995, filed in the Japan Patent Office on Oct. 25, 2010, the entire contents of which is incorporated herein by reference.

BACKGROUND

1. Technical Field

The present disclosure relates to a process for causing an aspect ratio for printing to match an aspect ratio of image data.

2. Description of the Related Art

Typical image forming apparatuses allow printing to be performed without converting an image data file of a Tagged Image File Format (TIFF) format or a Joint Photographic Experts Group (JPEG) format into Page Description Language (PDL) data or the like.

An example image forming apparatus analyzes a header part of image data to identify the numbers of dots (pixel counts) in a width direction and a height direction of an image and changes the pixel counts of the image data according to the size of print sheet.

Further, some image forming apparatuses calculate the maximum size of the image at a time of printing from the total pixel count of a digital camera, an aspect ratio, and a print resolution.

According to the above-mentioned image forming apparatuses, if a width-directional resolution and a height-directional resolution of the image data are the same, an aspect ratio of a printed image is the same as the aspect ratio of the image data. In contrast, if the width-directional resolution and the height-directional resolution of the image data are not the same, the aspect ratio of the printed image is different from the aspect ratio of the image data, and hence, the printed image becomes distorted in the width direction or the height direction.

For example, as illustrated in FIG. 5, in a case where both the resolutions of the image data in the width direction and the height direction are 200 dpi, if a width-directional pixel count of the image data is 1,200 and a height-directional pixel count thereof is 800, the width of the image is 6 inches and the height of the image is 4 inches. Therefore, the aspect ratio of the image is 3:2. In a case where the image is enlarged by a magnification factor m, the width of the image is 6×m inches and the height of the image is 4×m inches. Again, the aspect ratio of the image remains 3:2. If the enlarged image data is printed at a resolution of 600 dpi, a width size of the printed image is 2×m inches (=1,200×m/600 dpi), and a height size of the printed image is (4/3)×m inches (=800×m/600 dpi). Yet again, the aspect ratio of the printed image remains 3:2.

On the other hand, as illustrated in FIG. 5, consider a case where the width-directional resolution of the image data is 200 dpi and the height-directional resolution of the image data is 100 dpi. If the width-directional pixel count of the image data is 1,200 and the height-directional pixel count thereof is 400, the width of the image is 6 inches and the height of the image is 4 inches. Therefore, the aspect ratio of the image is 3:2. When the image is enlarged by a magnification m, the width of the image is 6×m inches and the height of the image is 4×m inches. Again, the aspect ratio of the image remains 3:2. However, if the enlarged image data is printed at a resolution of 600 dpi, the width size of the printed image is 2×m inches (=1,200×m/600 dpi) and the height size of the printed image is (2/3)×m inches (=400×m/600 dpi). Therefore, the aspect ratio of the printed image becomes 3:1, which is different from the aspect ratio of the image data, and the printed image becomes distorted as illustrated in the lower right-hand portion of FIG. 5.

SUMMARY

An image forming apparatus according to the present disclosure includes an image data analysis unit and an image conversion unit. The image data analysis unit is configured to identify a width-directional resolution and a height-directional resolution of image data. If the width-directional resolution and the height-directional resolution are not the same, the image conversion unit is configured to change at least one of the width-directional resolution and the height-directional resolution to cause a first aspect ratio for printing to match a second aspect ratio of the image data.

A non-transitory computer-readable storage medium according to the present disclosure stores an image forming program to be executed by a computer of the image forming apparatus. The image forming program includes a first program code and a second program code. The first program code causes the computer to identify a width-directional resolution and a height-directional resolution of image data. If the width-directional resolution and the height-directional resolution are not the same, the second program code causes the computer to change at least one of the width-directional resolution and the height-directional resolution to cause a first aspect ratio for printing to match a second aspect ratio of the image data.

An image forming method according to the present disclosure includes: (i) an image data analysis unit identifying a width-directional resolution and a height-directional resolution of image data; and (ii) an image conversion unit changing, if the width-directional resolution and the height-directional resolution are not the same, at least one of the width-directional resolution and the height-directional resolution to cause a first aspect ratio for printing to match a second aspect ratio of the image data.

Additional features and advantages are described herein, and will be apparent from the following Detailed Description and the figures.

DETAILED DESCRIPTION

Hereinafter, an embodiment of the present disclosure is described with reference to the accompanying drawings.

Figure 1:
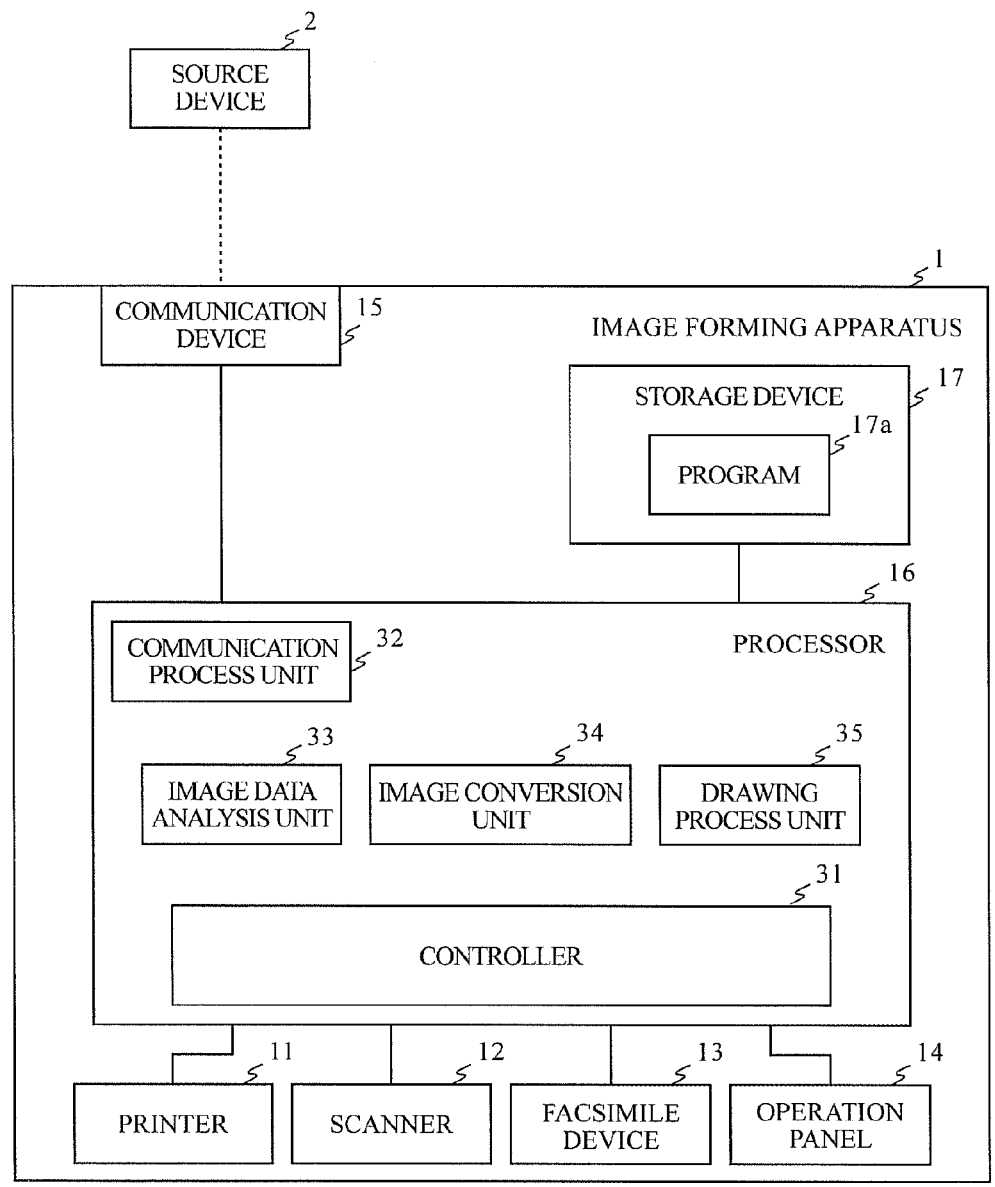
FIG. 1 shows a configuration of an image forming apparatus according to an embodiment of the present disclosure.

FIG. 1 shows a configuration of an image forming apparatus according to an embodiment of the present disclosure. The image forming apparatus illustrated in FIG. 1 is a multifunction peripheral, but may include other devices with print functions such as a printer, a copier, and a facsimile machine.

Image forming apparatus 1 illustrated in FIG. 1 includes printer 11, scanner 12, facsimile device 13, operation panel 14, communication device 15, processor 16, and storage device 17.

Printer 11 is an internal device that prints images onto a print sheet. Scanner 12 is an internal device that optically reads a document image from a document and generates image data on the document image. Facsimile device 13 is an internal device that generates and transmits a facsimile signal from image data on a document. Alternatively, facsimile device 13 may also receive a facsimile signal and convert the facsimile signal into image data.

Operation panel 14 is a user interface for image forming apparatus 1. Operation panel 14 is located on the surface of the body of image forming apparatus 1, and includes a display device that provides various kinds of information to a user and an input device that detects and receives user operations. For example, a liquid crystal display may be used as a display device. Further, key switches and a touch panel may be used together as an input device to detect and receive user operations. Yet further, the key switches may include both hardware and software inputs that are implemented by the display device and the touch panel.

Communication device 15 is connected to source device 2 via a network or a communication line. Communication device 15 may be a terminal device or a universal serial bus (USB) memory that performs data communications through specific communication protocols. Communication device 15 may include an interface such as a network interface, a modem, or a USB interface or the like. Source device 2 is a device that supplies image forming apparatus 1 with an image data file in an image data format such as TIFF or JPEG.

Processor 16 is a computer including a central processing unit (CPU), a read only memory (ROM), and a random access memory (RAM). Processor 16 loads programs from storage device 17, the ROM, or another storage area into the RAM, and causes the CPU to execute the programs, to thereby operate as various process units. Storage device 17 is a non-volatile storage device such as a hard disk drive or a flash memory, and stores image forming program 17a to be executed by processor 16.

After image forming apparatus 1 is activated, programs including image forming program 17a are appropriately executed by processor 16. In this embodiment, the image forming program 17a executed by processor 16 as well as an operating system implements process units such as controller 31, communication process unit 32, image data analysis unit 33, image conversion unit 34, and drawing process unit 35.

Controller 31 is a process unit that monitors and controls the internal devices such as printer 11, scanner 12, facsimile device 13, and operation panel 14.

Communication process unit 32 is a process unit that controls communication device 15 to execute data communications with source device 2 by a specific communication protocol.

Image data analysis unit 33 identifies a width-directional resolution and a height-directional resolution of image data. Image data analysis unit 33 identifies the image data format (such as TIFF or JPEG) of the image data. Further, image data analysis unit extracts the width-directional resolution and the height-directional resolution of the image data from an address within the image data that is previously defined for the image data format.

If width-directional resolution "Rx" and height-directional resolution "Ry" that have been identified by image data analysis unit 33 are not the same, image conversion unit 34 changes at least one of pixel counts in a width direction and a height direction to cause a first aspect ratio for printing to match a second aspect ratio of the image data.

In this embodiment, image conversion unit 34 calculates magnification m of an image size based on the pixel count of a maximum print area of the print sheet and the pixel count of aspect-ratio-matched image data. Image conversion unit 34 uses magnification m to change both a width size and a height size of the aspect-ratio-matched image data.

In this embodiment, magnification m is calculated so that the entire aspect-ratio-matched image data may be printed with a maximum size of the print area of the print sheet.

Specifically, image conversion unit 34 sets magnification m to be the smaller one of: magnification ratio "mx" obtained by dividing a width-directional pixel count "Px" of the maximum print area of the print sheet by a width-directional pixel count of the aspect-ratio-matched image data; and magnification ratio "my" obtained by dividing a height-directional pixel count "Py" of the maximum print area of the print sheet by a height-directional pixel count of the aspect-ratio-matched image data.

Note that, magnification m is decided based on a relationship between "Px" and the pixel count of the aspect-ratio-matched image data or a relationship between "Py" and the pixel count of the aspect-ratio-matched image data, and hence can assume a value larger than zero.

Further, if the orientation of the print sheet and the orientation of the image of the image data are different, image conversion unit 34 sets magnification m to the smaller one of magnification ratios "mx" and "my" that are obtained at a time when the image of the image data is rotated by 90 degrees.

Drawing process unit 35 performs a drawing process such as "digital halftoning" based on the image data that has been converted by image conversion unit 34. Data that has been subjected to the drawing process by drawing process unit 35 is read by controller 31, and printer 11 is controlled based on the data.

With this configuration, even if the width-directional resolution and the height-directional resolution of the image data are not the same, an image is printed at the same aspect ratio as the original aspect ratio of the image data.

In addition, it is possible to maximize the size of the printed image within the print area while maintaining the aspect ratio.

Figure 2:
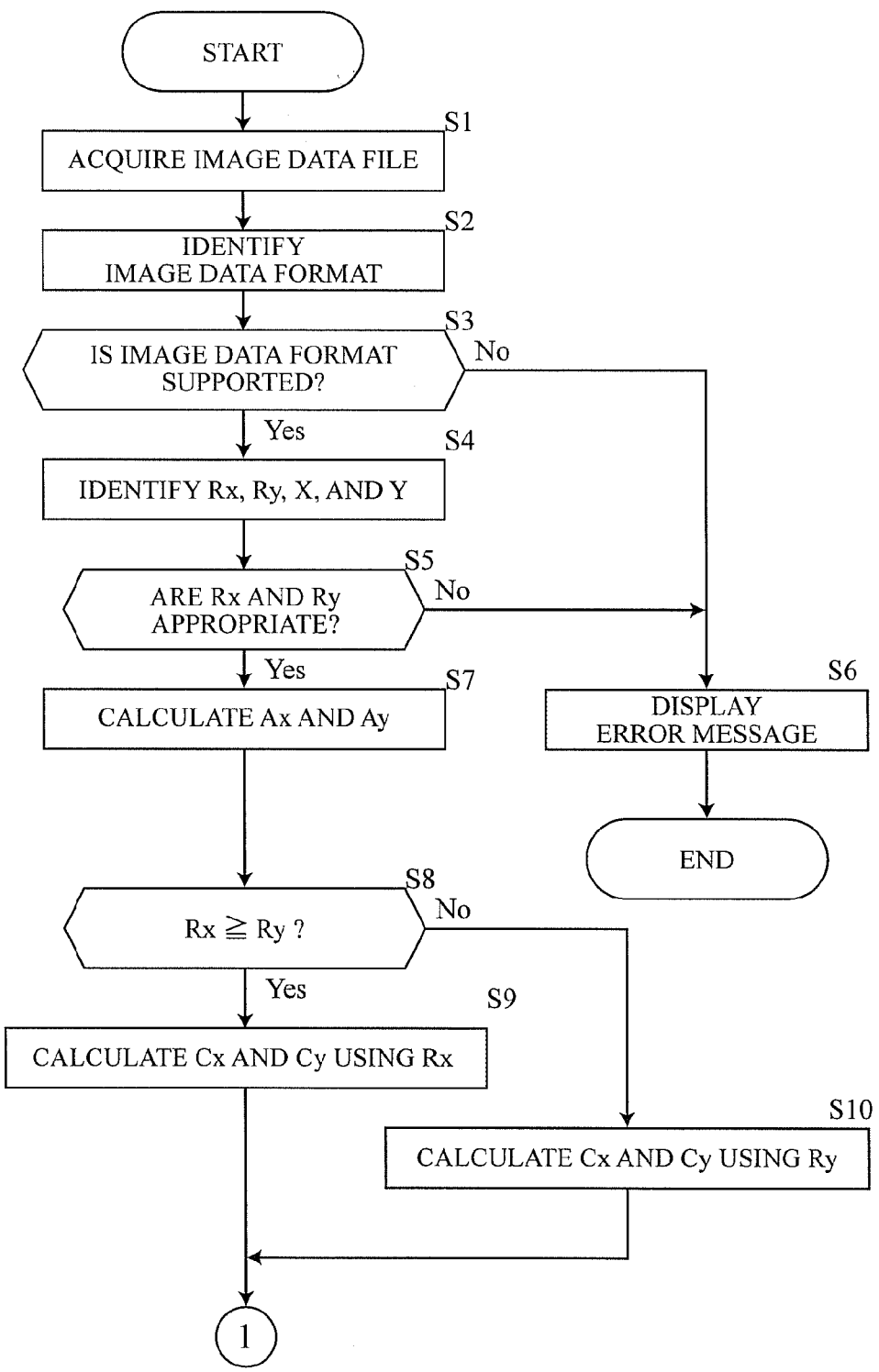
FIG. 2 shows a flowchart illustrating an operation of the image forming apparatus according to the embodiment of the present disclosure.
Figure 3:
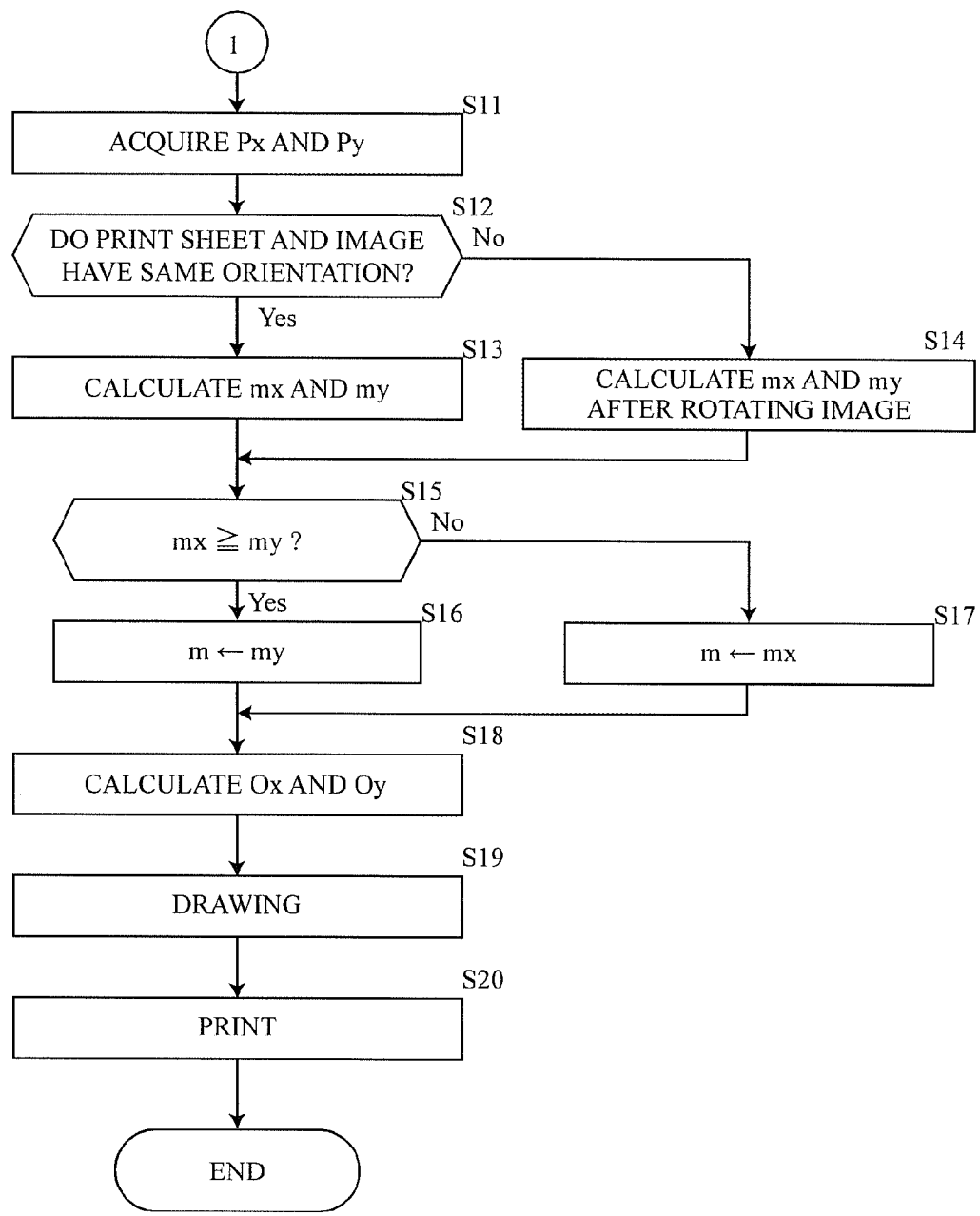
FIG. 3 shows a flowchart illustrating the operation of the image forming apparatus according to the embodiment of the present disclosure.

Next described is an operation of the image forming apparatus according to this embodiment. FIGS. 2 and 3 show flowcharts illustrating the operation of the image forming apparatus according to this embodiment.

When the communication process unit acquires an image data file from the source device through the communication device (Step S1), the image data analysis unit analyzes the image data file.

The image data analysis unit identifies the image data format of the image data file (Step S2), and determines whether or not the image data format is supported by the image forming apparatus (Step S3).

If the image data format of the image data file is a format supported by the image forming apparatus ("Yes" in Step S3), the image data analysis unit reads width-directional resolution "Rx" and height-directional resolution "Ry" of the image data from a specific location within the image data file (for example, specific location of a header part of data), and identifies width-directional pixel count "X" and height-directional pixel count "Y" of the image data (Step S4). If the values of width-directional pixel count "X" and height-directional pixel count "Y" of the image data are described in the specific location within the image data file, the image data analysis unit reads the values.

Then, the image data analysis unit determines whether or not resolutions "Rx" and "Ry" are appropriate values (Step S5). For example, if at least one of resolutions "Rx" and "Ry" is zero or an invalid value, then it is determined that resolutions "Rx" and "Ry" are not appropriate values.

Here, in a case of TIFF format image data or Exif format image data among JPEG format image data, resolutions "Rx" and "Ry" are obtained by dividing two values located at a specific address within the image data defined by the specifications of a TIFF format or an Exif format. If the numerator is zero, then the corresponding resolution "Rx" or "Ry" is zero. Further, if the denominator is zero, then the corresponding resolution "Rx" or "Ry" is an invalid value.

If it is determined in Step S3 that the image data format of the image data file is not a format supported by the image forming apparatus ("No" in Step S3), or if it is determined in Step S5 that resolution "Rx" or "Ry" is not an appropriate value ("No" in Step S5), the image data analysis unit requests the controller to output an error message. In that case, the controller causes the printer to print the error message or causes the operation panel to display the error message (Step S6).

If resolutions Rx and Ry are appropriate values ("Yes" in Step S5), the image conversion unit calculates width Ax and height Ay of an image of the image data file according to the following expressions (Step S7).

$$Ax[inch]=X/Rx[dpi]$$

$$Ay[inch]=Y/Ry[dpi]$$

Subsequently, the image conversion unit determines whether or not resolution "Rx" is equal to or larger than resolution "Ry" (Step S8).

If resolution "Rx" is equal to or larger than resolution "Ry" ("Yes" in Step S8), the image conversion unit uses resolution "Rx" (that is, larger resolution) to calculate width-directional pixel count "Cx" and height-directional pixel count "Cy" according to the following expressions (Step S9).

$$Cx=Ax[inch] \times Rx[dpi]=X$$

$$Cy=Ay[inch] \times Rx[dpi]$$

On the other hand, if resolution Rx is not equal to or larger than resolution "Ry" ("No" in Step S8), the image conversion unit uses resolution "Ry" (that is, larger resolution) to calculate width-directional pixel count "Cx" and height-directional pixel count "Cy" according to the following expressions (Step S10).

$$Cx=Ax[inch] \times Ry[dpi]$$

$$Cy=Ay[inch] \times Ry[dpi]=Y$$

The width-directional pixel count and the height-directional pixel count are corrected by the image conversion unit, using pixel counts "Cx" and "Cy", respectively. In some instances, only one of the width-directional pixel count "X" or height-directional pixel count "Y" is changed. Accordingly, a first aspect ratio of a printed image becomes the same as the second aspect ratio of the image data.

Subsequently, the image conversion unit acquires print size information on the print sheet selected on printer 11 through the controller (Step S11). The print size information includes the width-directional pixel count "Px" and the height-directional pixel count "Py" of the maximum printable area of the print sheet.

Further, the image conversion unit acquires information on the orientation (e.g., portrait or landscape) of the print sheet selected on the printer through the controller. Further, the image conversion unit makes a determination identifying the orientation of the image as one of portrait or landscape by analyzing the image data file. Then, the image conversion unit determines whether or not the orientation of the print sheet and the orientation of the image are the same (Step S12).

If the orientation of the print sheet and the orientation of the image are the same ("Yes" in Step S12), the image conversion unit calculates magnification ratio mx of the width direction and magnification ratio my of the height direction according to the following expressions (step S13).

$$mx=Px/Cx$$

$$my=Py/Cy$$

On the other hand, if the orientation of the print sheet and the orientation of the image are not the same, the image conversion unit calculates magnification ratio "mx" of the width direction and magnification ratio "my" of the height direction according to the following expressions.

$$mx=Px/Cy$$

$$my=Py/Cx$$

Then, the image conversion unit determines whether or not magnification ratio "mx" is larger than magnification ratio "my" (Step S15). If magnification ratio mx is larger than magnification ratio my ("Yes" in Step S15), the image conversion unit sets magnification "m" to magnification ratio "my" (that is, smaller resolution) (Step S16), and if magnification ratio "mx" is not larger than magnification ratio "my" ("No" in Step S15), sets magnification "m" to magnification ratio "mx" (that is, smaller resolution) (Step S17).

Further, the image conversion unit calculates the printed image sizes (width size "Ox" and height size "Oy" of the printed image) using magnification m, print resolution Rp, and corrected pixel counts "Cx" and "Cy", according to the following expressions.

$$Ox=Cx \times m/Rp$$

$$Oy=Cy \times m/Rp$$

Yet further, the drawing process unit performs the drawing process on the image data having width size "Ox" and height size "Oy" of the printed image (Step S19).

Data that has been subjected to the drawing process by the drawing process unit is output to the printer by the controller. The data that has been subjected to the drawing process by the drawing process unit is read by the controller, and the printer is controlled based on the data (Step S20).

In addition, if it is determined in Step S12 that the orientation of the print sheet and the orientation of the image are not the same ("No" in Step S12), the image conversion unit or the drawing process unit processes the image data to rotate the image by 90 degrees. After that, the image conversion unit calculates magnification ratio "mx" of the width direction and magnification ratio "my" of the height direction according to the expressions set forth above with respect to step S13 (step S14). Then the process moves to step S15.

Figure 4:
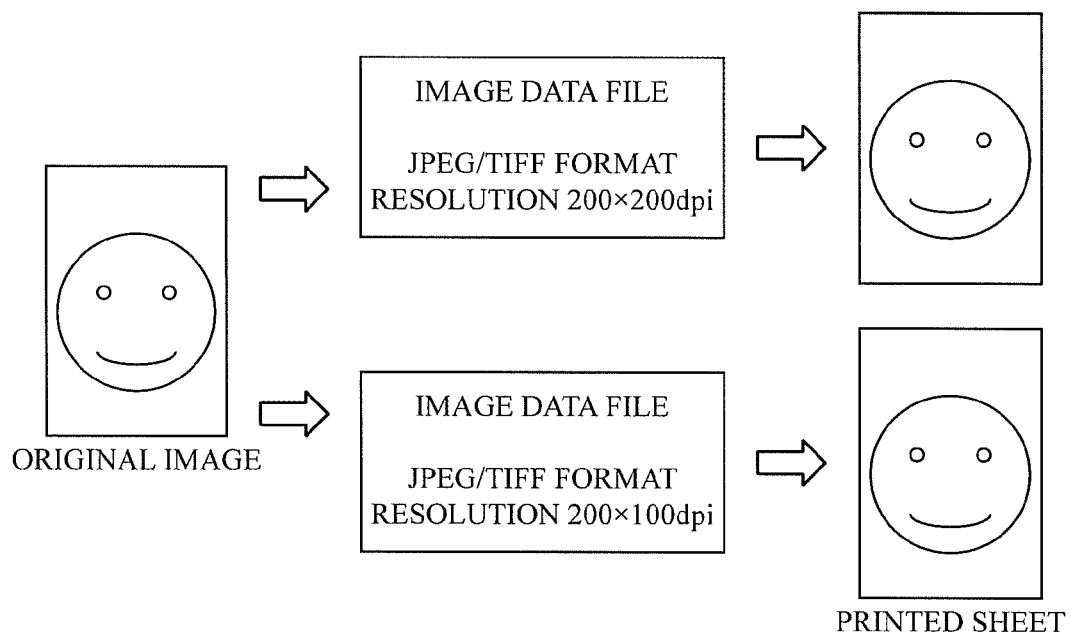
FIG. 4 shows examples of an image printed by the image forming apparatus according to the embodiment of the present disclosure.
Figure 5:
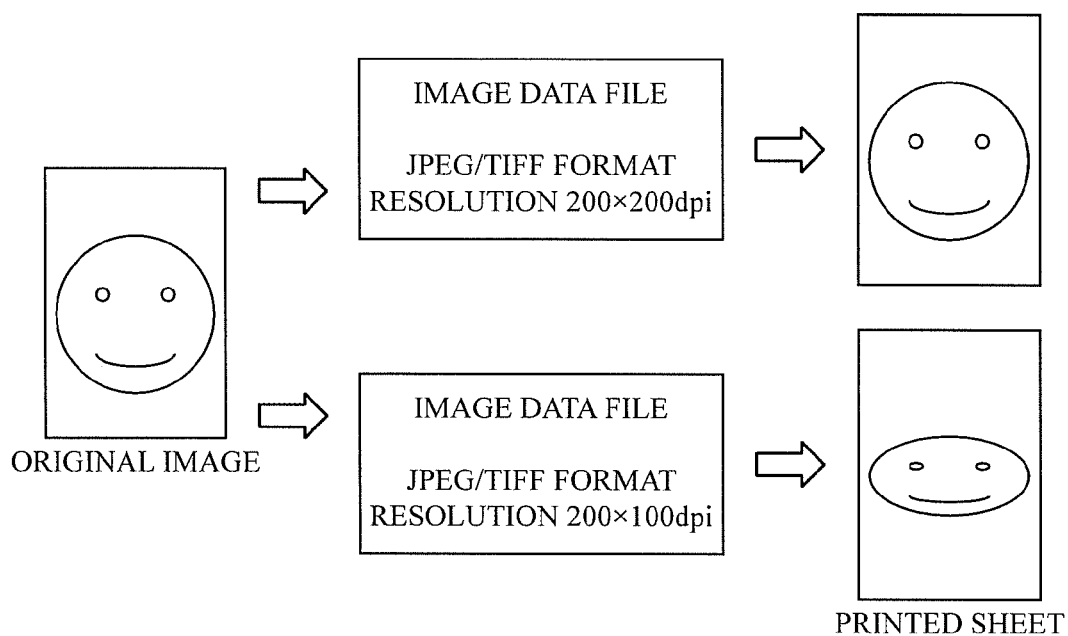
FIG. 5 shows examples of an image printed by an image forming apparatus using a technique other than presently disclosed.

FIG. 4 shows examples of an image printed by the image forming apparatus illustrated in FIG. 1 in a case where the width-directional resolution and the height-directional resolution of the image data are different.

As illustrated in FIG. 4, consider a case where both the resolutions of the image data in the width direction and the height direction are 200 dpi. Further, if the width-directional pixel count of the image data is 1,200 and the height-directional pixel count thereof is 800, the width of the image is 6 inches and the height of the image is 4 inches. Therefore, the second aspect ratio of the image data is 3:2. In a case where the image is enlarged at the magnification m, the width of the image is 6×m inches and the height of the image is 4×m inches. Again, the aspect ratio of the enlarged image remains 3:2. If the enlarged image data is printed at a resolution of 600 dpi, the width size of the printed image is 2×m inches (=1,200×m/600 dpi), and the height size of the printed image is (4/3)×m inches (=800×m/600 dpi). Yet again, the first aspect ratio of the printed image maintains the 3:2 ratio.

On the other hand, as illustrated in FIG. 4, consider a case where the width-directional resolution of the image data is 200 dpi and the height directional resolution thereof is 100 dpi. Further, if the width-directional pixel count of the image data is 1,200 and the height-directional pixel count thereof is 400, the width of the image is 6 inches and the height of the image is 4 inches. Therefore, the second aspect ratio of the image data is 3:2. In the case where the image is enlarged at the magnification m, the width of the image is 6×m inches and the height of the image is 4×m inches. Again, the aspect ratio of the enlarged image remains 3:2. At this time, Rx is larger than Ry, and hence Cx=6[inch]×200 [dpi]=1,200 and Cy=4 [inch]×200 [dpi]=800. Accordingly, Ox=1,200×m/600[dpi] =2×m[inch] and Oy=800×m/600 [dpi]=(4/3)×m [inch], and the resulting first aspect ratio of the printed image maintains the 3:2 ratio.

In this manner, even in the case where the width-directional resolution and the height-directional resolution are different from each other in the image data file, the first aspect ratio of the printed image maintains the second aspect ratio of the image of the image data file.

As described above, according to the above-mentioned embodiment, the image data analysis unit identifies the width-directional resolution and the height-directional resolution of the image data, and if the width-directional resolution and the height-directional resolution are not the same, the image conversion unit changes at least one of the width-directional pixel count and the height-directional pixel count to cause the first aspect ratio for printing to match the second aspect ratio of the image data.

With this configuration, even in the case where the width-directional resolution and the height-directional resolution of the image data are not the same, an image is printed at the same aspect ratio as the original aspect ratio of the image data.

Note that the above-mentioned embodiment is an example of the present disclosure, but the present disclosure is not limited thereto, and various modifications and changes can be made without departing from the gist of the present disclosure.

For example, in the above-mentioned embodiment, the image conversion unit may change both the width-directional pixel count and the height-directional pixel count of the image data to maintain the aspect ratio.

Further, in the above-mentioned embodiment, the process of Step S9 is performed in the case where Rx=Ry in the same manner as in the case where Rx>Ry, but it suffices that X and Y are simply used instead of "Cx" and "Cy", respectively.

Further, in the above-mentioned embodiment, the larger one of Rx and Ry is selected to correct the pixel count in Step S9 or Step S10, but the smaller one of "Rx" and "Ry" may be selected instead to correct the pixel count in Step S9 or Step S10.

The present disclosure can be applied to image forming apparatuses such as, for example, a printer and a multifunction peripheral.

It should be understood that various changes and modifications to the presently embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An image forming apparatus, comprising:
   an image data analysis unit configured to identify a width-directional resolution and a height-directional resolution of image data; and
   an image conversion unit configured to change, if the width-directional resolution and the height-directional resolution are not the same, at least one of the width-directional resolution and the height-directional resolution to cause a first aspect ratio for printing to match a second aspect ratio of the image data, wherein the image conversion unit is further configured to:
   calculate a magnification of an image size based on a pixel count of a maximum print area of a print sheet and a pixel count of aspect-ratio-matched image data;
   use the magnification to change both a width and a height of the aspect-ratio-matched image data; and
   set the magnification to a smaller one of:
      a first magnification ratio obtained by dividing a width-directional pixel count of the maximum print area of the print sheet by a width-directional pixel count of the aspect-ratio-matched image data; and
      a second magnification ratio obtained by dividing a height-directional pixel count of the maximum print area of the print sheet by a height-directional pixel count of the aspect-ratio-matched image data.

2. The image forming apparatus according to claim 1, wherein the image conversion unit is further configured to calculate a width-directional pixel count and a height-directional pixel count by multiplying each of a width size of the image data and a height size of the image data by one of the width-directional resolution and the height-directional resolution, to thereby cause the first aspect ratio for printing to match the second aspect ratio of the image data.

3. The image forming apparatus according to claim 1, wherein the image conversion unit is further configured to set, if an orientation of the print sheet and an orientation of an image of the aspect-ratio-matched image data are different, the magnification to the smaller one of the first magnification ratio and the second magnification ratio that are obtained at a time when the image of the aspect-ratio-matched image data is rotated by 90 degrees.

4. The image forming apparatus according to claim 1, wherein after the image conversion unit sets the magnification to the smaller one of the first magnification ratio and the second magnification ratio, a drawing process unit performs a drawing process based on the image data.

5. The image forming apparatus according to claim 1, wherein the image data analysis unit is further configured to output an error message if at least one of the width-directional resolution and the height-directional resolution is one of zero and an invalid value.

6. A non-transitory computer-readable storage medium that stores an image forming program to be executed by a computer of an image forming apparatus, the image forming program comprising:
 a first program code that causes the computer to identify a width-directional resolution and a height-directional resolution of image data; and
 a second program code that causes the computer to change, if the width-directional resolution and the height-directional resolution are not the same, at least one of the width-directional resolution and the height-directional resolution to cause a first aspect ratio for printing to match a second aspect ratio of the image data, wherein the second program code further causes the computer to:
 calculate a magnification of an image size based on a pixel count of a maximum print area of a print sheet and a pixel count of aspect-ratio-matched image data;
 use the magnification to change both a width and a height of the aspect-ratio-matched image data that is obtained after the pixel count is changed; and
 set the magnification to a smaller one of:
  a first magnification ratio obtained by dividing a width-directional pixel count of the maximum print area of the print sheet by a width-directional pixel count of the aspect-ratio-matched image data; and
  a second magnification ratio obtained by dividing a height-directional pixel count of the maximum print area of the print sheet by a height-directional pixel count of the aspect-ratio-matched image data.

7. The non-transitory computer-readable storage medium according to claim 6, wherein the second program code further causes the computer to:
 calculate a width-directional pixel count and a height-directional pixel count by multiplying each of a width size of the image data and a height size of the image data by one of the width-directional resolution and the height-directional resolution, and
 cause the first aspect ratio for printing to match the second aspect ratio of the image data.

8. The non-transitory computer-readable storage medium according to claim 6, wherein the second program code further causes the computer to set, if an orientation of the print sheet and an orientation of an image of the aspect-ratio-matched image data are different, the magnification to the smaller one of the first magnification ratio and the second magnification ratio that are obtained at a time when the image of the aspect-ratio-matched image data is rotated by 90 degrees.

9. The non-transitory computer-readable storage medium according to claim 6, wherein after the second program code causes the computer to set the magnification to the smaller one of the first magnification ratio and the second magnification ratio, the second program code further causes a drawing process unit to perform a drawing process based on the image data.

10. The non-transitory computer-readable storage medium according to claim 6, wherein the first program code further causes the computer to output an error message if at least one of the width-directional resolution and the height-directional resolution is one of zero and an invalid value.

11. An image forming method, comprising:
 an image data analysis unit identifying a width-directional resolution and a height-directional resolution of image data; and
 an image conversion unit
  changing, if the width-directional resolution and the height-directional resolution are not the same, at least one of the width-directional resolution and the height-directional resolution to cause a first aspect ratio for printing to match a second aspect ratio of the image data,
  calculating a magnification of an image size based on a pixel count of a maximum print area of print sheet and a pixel count of aspect-ratio-matched image data,
  using the magnification to change both a width and a height of the aspect-ratio-matched image data, and
  setting the magnification to a smaller one of:
   a first magnification ratio obtained by dividing a width-directional pixel count of the maximum print area of the print sheet by a width-directional pixel count of the aspect-ratio-matched image data; and
   a second magnification ratio obtained by dividing a height-directional pixel count of the maximum print area of the print sheet by a height-directional pixel count of the aspect-ratio-matched image data.

12. The image forming method according to claim 11, further comprising the image conversion unit calculating a width-directional pixel count and a height-directional pixel count by multiplying each of a width size of the image data and a height size of the image data by one of the width-directional resolution and the height-directional resolution, to thereby cause the first aspect ratio for printing to match the second aspect ratio of the image data.

13. The image forming method according to claim 11, further comprising the image conversion unit setting, if an orientation of the print sheet and an orientation of an image of the image data are different, the magnification to the smaller one of the first magnification ratio and the second magnification ratio that are obtained at a time when the image of the aspect-ratio-matched image data is rotated by 90 degrees.

14. The image forming method according to claim 11, further comprising the image data analysis unit outputting an error message if at least one of the width-directional resolution and the height-directional resolution is one of zero and an invalid value.

* * * * *